United States Patent
Furuta (12)

(10) Patent No.: US 6,717,535 B2
(45) Date of Patent: Apr. 6, 2004

(54) SYSTEM AND METHOD FOR PREVENTING INPUT OF VARIABLE LENGTH CODES FROM BEING INTERRUPTED

(75) Inventor: Yuji Furuta, Tokyo (JP)

(73) Assignee: NEC Corporation, Tokyo (JP)

(*) Notice: Subject to any disclaimer, the term of this patent is extended or adjusted under 35 U.S.C. 154(b) by 30 days.

(21) Appl. No.: 10/142,153

(22) Filed: May 10, 2002

(65) Prior Publication Data

US 2002/0167427 A1 Nov. 14, 2002

(30) Foreign Application Priority Data

May 11, 2001 (JP) .................................. 2001-141950

(51) Int. Cl.[7] .............................................. H03M 7/40
(52) U.S. Cl. ............................ 341/67; 341/65; 710/57; 348/419.1; 382/246
(58) Field of Search .................... 341/65, 67; 382/239, 382/246; 348/419.1; 710/53, 57

(56) References Cited

U.S. PATENT DOCUMENTS

| | | | | |
|---|---|---|---|---|
| 5,781,135 A | * | 7/1998 | Kim et al. .................. | 341/67 |
| 5,974,483 A | * | 10/1999 | Ray et al. .................. | 710/52 |
| 6,061,402 A | * | 5/2000 | Boyce et al. ............... | 375/240 |
| 6,587,480 B1 | * | 7/2003 | Higgins et al. ............. | 370/522 |
| 2002/0003845 A1 | * | 1/2002 | Kamiya ...................... | 375/340 |

FOREIGN PATENT DOCUMENTS

| | | |
|---|---|---|
| EP | 0 653 888 A2 | 5/1995 |
| EP | 0 896 479 A2 | 2/1999 |
| JP | 7-245760 | 9/1995 |
| JP | 10-155151 | 6/1998 |
| JP | 10-174101 | 6/1998 |
| JP | 10-210464 | 8/1998 |
| JP | 11-18078 | 1/1999 |
| JP | 2000-138818 | 5/2000 |
| JP | 2001-345769 | 12/2001 |

OTHER PUBLICATIONS

Japanese Office Action dated Nov. 25, 2003 with Partial English Translation.
European Search Report dated Dec. 3, 2003.
Yuji Fukuzuwa, et al., "A Programmable VLC Core Architecture for Video Compression DSP", Signal Processing Systems, 1997 IEEE, Nov. 3, 1997, pp. 469–478, XP010249807.
Jui–Hua Li et al., "An Efficient Video Decoder Design for MPEG–2 MP@ML", Application–Specific Systems, Architectures and Processors, 1997, Jul. 14, 1997, pp. 509–518, XP010236720.

* cited by examiner

*Primary Examiner*—Howard L. Williams
(74) *Attorney, Agent, or Firm*—McGinn & Gibb, PLLC

(57) ABSTRACT

A system and method that prevent an input of variable length codes in which short length codes continue from being interrupted without an increase of a circuit scale are provided. The system comprises a variable length decoding device for decoding variable length codes, a buffer for buffering the variable length codes to be supplied to the variable length decoding device, a detector for detecting whether or not a occupation rate of the variable length codes in the buffer has increased, and a discarder for discarding the variable length codes to be supplied to the buffer when the detected result by the detector represents that the occupation rate of the variable length codes in the buffer has increased. The system further comprises an elementary stream extractor, disposed between the discarding device and the buffer, for extracting an elementary stream defined in MPEG standard.

45 Claims, 10 Drawing Sheets

FIG.2

| ATTRIBUTE OF MACRO BLOCK | OBJECT TO BE ENCODED | SIGN | CAPABILITY OF INSERTION OF ELECTRONIC WATERMARK |
|---|---|---|---|
| Macro_intra=0 or Macro_intra=1 and Intra_vlc_format=0 | EOB | 10 | × |
| Macro_intra=0 or Macro_intra=1 and Intra_vlc_format=0 | DC level =1 | 1s | × |
| Macro_intra=0 or Macro_intra=1 and Intra_vlc_format=0 | (run, level) = (0,1) | 11s | ○ |
| Macro_intra=1 and Intra_vlc_format=1 | (run, level) = (0,1) | 10s | ○ |

FIG.3

| CODE INTO WHICH ELECTRONIC WATERMARK CAN BE INSERTED | CODE THAT CAN BE PAIRED WITH LEFT-HAND CODE | CODE SEQUENCE BEFORE ELECTRONIC WATERMARK IS INSERTED | CODE SEQUENCE AFTER ELECTRONIC WATERMARK IS INSERTED |
|---|---|---|---|
| 11s for (run, level) = (0,1) | 011s for (run, level) = (1,1) | 11s011s | 011s11s |
| | | 011s11s | 11s011s |
| 10s for (run, level) = (0,1) | 110s for (run, level) = (0,2) | 10s110s | 110s10s |
| | | 110s10s | 10s110s |
| | 010s for (run, level) = (1,1) | 10s010s | 010s10s |
| | | 010s10s | 10s010s |

SYSTEM AND METHOD FOR PREVENTING INPUT OF VARIABLE LENGTH CODES FROM BEING INTERRUPTED

BACKGROUND OF THE INVENTION

1. Field of the Invention

The present invention relates to a system and method for preventing an input of variable length codes from being interrupted. In particular, the present invention relates to a system and method for preventing an input of variable length codes of an MPEG (Motion Picture Experts Group) signal from being interrupted.

2. Description of the Related Art

An MPEG signal contains a video variable length code and an audio variable length code. The video variable length code is obtained by compressing a video signal corresponding to motion compensated bi-directional inter-frame prediction encoding system using discrete cosine transforming system. The audio variable length code is obtained by compressing an audio signal corresponding to sub-band encoding system. An MPEG signal is used to highly efficiently transmit audio and video signals. In addition, an MPEG signal is used to record audio and video signals to a record medium such as a DVD (Digital Versatile Disc) or a hard drive.

Since an MPEG signal is a digital signal, even if it is copied, the quality thereof is not deteriorated. Thus, when an MPEG signal is illegally copied, the copyright of the content producer is infringed.

To solve such a problem, a technology for inserting an electronic watermark that represents a copyright into DCT (Discrete Cosine Transform) coefficient codes of an MPEG signal that is recorded on a record medium such as a DVD has been developed. In addition, a technology for inserting an electronic watermark for controlling a copying operation into DCT coefficient codes of an MPEG signal that is recorded on a record medium such as a DVD has been developed. In particular, as one type of an electronic watermark for controlling a copying operation, an electronic watermark that does not vary the code amount has been developed. Such an electronic watermark has been used by a content producer. A circuit that detects such an electronic watermark is disposed in a DVD player or a DVD recorder. In the case that such an electronic watermark represents that a copying operation is prohibited, when an MPEG signal into which such an electronic watermark has been inserted is tried to be copied from one DVD to another DVD, the MPEG signal cannot be copied. Thus, the copyright of the content producer can be protected.

When an MPEG signal is copied from one DVD to another DVD, it is preferred to perform it at high speed without need to output a sound and a picture to a speaker and a monitor from a view point of high efficiency. Thus, when an MPEG signal is copied from one DVD to another DVD, a DVD reproducing drive (not DVD player) that reproduces an MPEG signal at a speed several times (or more times) higher than the regular reproducing speed and a DVD recording drive (not DVD player) that records an MPEG signal at a speed several times (or more times) higher than the regular recording speed.

However, to prevent an MPEG signal from being illegally copied, although the DVD drive does not need to provide an MPEG decoding device, the DVD drive should be equipped with a function for decoding a reproduced MPEG signal to DCT coefficients and detecting an electronic watermark from the obtained DCT coefficients.

As an example of related art, FIG. 1 is a block diagram showing a circuit that decodes an MPEG signal to DCT coefficients and detects an electronic watermark from the obtained DCT coefficients.

Referring to FIG. 1, the circuit has an input interface 901, a buffer 902, a video elementary stream extracting circuit 903, a barrel shifter 904, a variable length decoding device 905, a controlling portion 906, an inverse quantizing device 907, and an electronic watermark detecting device 908.

The input interface 901 and an input side of the buffer 902 is driven by an external interface clock that also drives an output interface of a pre-stage portion (not shown). An output side of the buffer 902 and circuits downstream thereof are driven by an internal clock that does not synchronize with the external interface clock.

In addition to an MPEG signal reproducing device such as a DVD reproducing drive, the electronic watermark detecting circuit may be built in an MPEG signal recording device such as a DVD recording drive or an interface device disposed between an MPEG signal reproducing device and an MPEG signal recording device. When an electronic watermark detecting circuit is built in an MPEG signal reproducing device, the pre-stage portion contains a mechanism of an MPEG signal reproducing device, a reproducing mechanism system such as a servo, and a reproduction signal processing system such as a digital signal decoding operation and an error correcting process. When an electronic watermark detecting circuit is built in an MPEG signal recording device or an interface device, the pre-stage portion is for example an MPEG signal reproducing device or a video server connected through a network.

The input interface 901 inputs an eight-bit wide transport stream or eight-bit wide program stream that synchronizes with the external interface clock of the pre-stage portion (hereinafter, both the streams are generally referred to as "stream"). The stream is output to the buffer 902.

The buffer 902 has a clock changing function that causes a stream that synchronizes with an external interface clock to synchronize with an internal clock. In addition, the buffer 902 has a function for absorbing the discontinuity of a stream supplied to the barrel shifter 904, the discontinuity taking place due to the fluctuation of the length of the code decoded by the variable length decoding device 905. For example, the buffer 902 is composed of a FIFO (First-In First-Out). As a write clock for the FIFO memory, the external interface clock is used. As a read clock for the FIFO memory, the internal clock is used. Of course, the write clock of the FIFO memory may synchronize with the read clock thereof. However, generally, the write clock of the FIFO memory does not synchronize with the read clock thereof.

The video elementary stream extracting circuit 903 has a function for extracting a video elementary stream from the input stream. The video elementary stream extracting circuit 903 delays the input stream by the number of clock pulses required to detect the video elementary stream and outputs the resultant frame and a valid flag that represents that each byte of the output stream is contained in the video elementary stream. The video elementary stream extracting circuit 903 is disclosed in for example Japanese Patent Laid-Open Publication No. 2001-345769.

The video elementary stream is a stream placed in a payload of a video PES (Packetized Elementary Stream) (the payload is a remaining portion of a video PES after a PES header is removed therefrom). The video elementary stream is defined in ISO 13818-1.

The barrel shifter 904 is driven by the internal clock whose clock frequency is approximately twice as high as the external interface clock (hereinafter, the internal clock is referred to as two-multiple clock). The barrel shifter 904 continuously inputs an eight-bit wide stream and outputs a stream having a width of 1 to 32 effective bits. Next, the operation of the barrel shifter 904 will be described in detail. The barrel shifter 904 shifts out bits (or proximately decoded bits) designated by the controlling portion 906 from an output shift register of 32-bit width at each two-multiple clock pulse. An output of each register of the output shift register is also supplied to the variable length decoding device 905. When those bits are shifted out, bits that reside in the output shift register are shifted to the beginning portion by bits that have been shifted out. Insufficient bits at the end portion of the output shift register are compensated with each bit of a bit group of the stream that is intermittently input in a unit of byte. After a variable length code is decoded, all bits of at most 32-bit variable length code are arranged in the output shift register. Alternatively, to perform a high speed process, the barrel shifter 904 may be composed of a regular register group and a switch group instead of the output shift register.

Unlike a conventional barrel shifter, the barrel shifter 904 does not input a byte corresponding to a valid flag of which the value represents that the byte is not contained in the video elementary stream. Thus, the barrel shifter inputs only the video elementary stream. By the way, the barrel shifter 904 may be driven by an internal clock other than the two-multiple frequency. For example, the barrel shifter 904 may be driven by an internal clock whose frequency is 1.5 times or 1.9 times higher than the frequency of the external interface clock.

The variable length decoding device 905 decodes a variable length code contained in an output of the barrel shifter 904 in each code unit. The variable length decoding device 905 decodes not only a variable length code for DCT coefficients, but all codes of the video elementary stream containing codes of a sequence header layer, a picture header layer, a slice layer, and a macro block layer and outputs DCT coefficients of the decoded data to the inverse quantizing device 907. The variable length decoding device 905 outputs an error flag that represents whether or not data has been successfully decoded. When the data has been decoded, the variable length decoding device 905 outputs the code length of the decoded code to the controlling portion 906.

The controlling portion 906 outputs the number of bits to be shifted out from the barrel shifter 904 corresponding to the code length that is input from the variable length decoding device 905 to the barrel shifter 904. In addition, the controlling portion 906 controls the decoding operation of the video elementary stream. When the variable length decoding device 905 cannot decode the data due to an occurrence of an error, the variable length decoding device 905 causes the error flag to be active. The variable length decoding device 905 causes the barrel shifter 904 to shift out data with eight bits at a time (byte aligned) so as to decode a byte aligned code (a code that begins at a byte boundary) at a refresh position (at which an error is prevented from propagating) of a slice header code, a picture header code, a sequence header code, or the like. Thus, even if the variable length decoding device 905 cannot decode a variable length code to DCT coefficients due to an occurrence of an error, the variable length decoding device 905 can resume the decoding operation from a refresh position of a byte align code of a slice header code, a picture header code, a sequence code header, or the like.

The controlling portion 906 has a function for calculating a process unit (that is an output unit of the barrel shifter 904) starting from a sequence header code to a decoding operation for DCT coefficients, analyzing the data structure of a video elementary stream starting from a sequence header code to DCT coefficients corresponding to a predetermined parameter stored in the controlling portion 906, and detecting a structure error.

The inverse quantizing device 907 calculates DCT coefficients of each DCT block corresponding to a pair of a zero run and a level, Q_Table and Q_Scale that are input from the variable length decoding device 905. When Q_Table has been set in Quantum_Matrix_Extension of the sequence header layer or the picture header layer, Q_Table is used for calculating DCT coefficients. When Q_Table has not been set, the initial value of Q_Table defined in the MPEG specification is used to calculate DCT coefficients. Q_Scale is obtained by using a table defined in the MPEG specifications corresponding to Q_Scale_Type and Q_Scale_Code. The controlling portion 906 has the table. Q_Scale_Type is contained in Picture_Coding_Extension of the picture layer. Q_Scale_Code is contained in the slice layer and the macro block layer.

The electronic watermark detecting device 908 detects an electronic watermark from DCT coefficients that are input from the inverse quantizing device 907. As a method for detecting an electronic watermark by the electronic watermark detecting device 908, a technology disclosed in for example Japanese Patent Laid-Open Publication No. 2000-138818 or Japanese Patent No. 3109575 (Japanese Patent Laid-Open Publication No. 10-155151) is used.

The input interface 901 does a handshake with the buffer 902 using an output request signal that the input interface 901 outputs to the buffer 902 and an input permission signal that the buffer 902 outputs to the input interface 901. Likewise, the pre-stage portion does a handshake with the input interface 901. The buffer 902 does a handshake with the video elementary stream extracting circuit 903. The video elementary stream extracting circuit 903 does a handshake with the barrel shifter 904. The barrel shifter 904 does a handshake with the variable length decoding device 905. The variable length decoding device 905 does a handshake with the inverse quantizing device 907. According to a handshake, when the post-stage circuit is not ready for inputting a signal, the pre-stage circuit temporarily stops outputting a signal.

The code length of an MPEG signal is in the range from 2 bits to 31 bits. The code length of a DCT coefficient of a MPEG signal is in the range from 2 bits to 24 bits. Thus, depending on a picture, codes of 4 bits or less each may statistically continue. An input stream is input with a width of eight bits and a barrel shifter is driven by a two-multiple clock. Therefore, when codes whose average code length is four bits continue, the amount of codes stored in the buffer 902 slightly varies around a constant value. In contrast, when codes whose average code length is less than four bits continue, the amount of codes stored in the buffer 902 continuously increases. In other words, when codes whose code length is less than four bits each continue, the occupation rate of a variable length code in the buffer 902 increases. Thus, to prevent the buffer 902 from overflowing, (1) the storage capacity of the buffer 902 shall be increased, (2) the input interface 901 shall do a handshake with the buffer 902 and also the pre-stage portion shall do a handshake with the interface 901 so as to temporarily stop the stream supplied from the pre-stage portion to the input interface, or (3) the frequency of the drive clock of the barrel shifter shall be raised.

However, when the storage capacity of the buffer 902 is increased, the circuit scale becomes large. As a result the cost of the device rises. In addition, to temporarily stop the stream supplied from the pre-stage portion to the input interface, the corresponding function should be disposed in the pre-stage portion. Thus, an additional circuit, an additional mechanism, or the like is required. As a result, the cost of the device rises. In addition, when the frequency of the drive clock of the barrel shifter is raised, it becomes difficult to design the timings of the barrel shifter and the peripheral circuits. In addition, the circuit scale becomes large. As a result, the cost of the device rises.

SUMMARY OF THE INVENTION

The prevent invention is made from the foregoing point of view. An object of the present invention is to provide a system and method for preventing an input of variable length codes from being interrupted even if short length codes continue without need to increase the circuit scale.

When a moving picture is reproduced from an MPEG signal, it is desired to obtain as much video information and audio information as possible from the MPEG signal from a view point of high quality. Thus, when a moving picture is reproduced, an error correction, an error detection, and an error concealment are performed. In addition, even if an error takes place, it is immediately prevented from propagating. Thus, it is not proper to discard non-error portion of the MPEG signal from a view point of high quality.

On the other hand, in an electronic watermark detecting device that detects an electronic watermark from an MPEG signal, it is not necessary to reproduce a moving picture and a sound in high quality. In addition, to detect an electronic watermark from an MPEG signal, it is not necessary to restore data of all DCT blocks of a frame. Even if several percent or several ten percent of all DCT blocks of a frame cannot be restored, an electronic watermark can be detected with the rest of the DCT blocks that have been restored. In an extreme case, when an electronic watermark cannot be detected with a predicted number of DCT blocks, the electronic watermark can be detected using the next frames.

According to the present invention, a non-error portion of the MPEG signal is also discarded to prevent an input of variable length codes from being interrupted on the assumption that an electronic watermark detecting device that detects an electronic watermark from an MPEG signal is used.

According to a first aspect of the present invention, there is provided a system for preventing an input of variable length codes from being interrupted, the system comprising: a variable length decoding device for decoding the variable length codes; a buffer for buffering the variable length codes to be supplied to the variable length decoding device; detecting means for detecting whether or not an occupation rate of the variable length codes in the buffer has increased; and discarding means for discarding the variable length codes to be supplied to the buffer when the occupation rate of the variable length codes in the buffer has increased.

In the system according to the first aspect, the system may deal with an MPEG (Motion Picture Experts Group) signal, and the system may further comprise: elementary stream extracting means, disposed between the buffer and the variable length decoding device, for extracting an elementary stream defined in MPEG standard.

In the system according to the first aspect, the system may deal with an MPEG (Motion Picture Experts Group) signal, and the system may further comprise: elementary stream extracting means, disposed upstream of the discarding means, for extracting an elementary stream defined in MPEG standard.

According to a second aspect of the present invention, there is provided a system for preventing an input of variable length codes from being interrupted, the system comprising: a variable length decoding device for decoding the variable length codes; a buffer for buffering the variable length codes to be supplied to the variable length decoding device; detecting means for detecting whether or not an occupation rate of the variable length codes in the buffer has increased; and skipping means for causing the variable length decoding device to skip the decoding operation when the occupation rate of the variable length codes in the buffer has increased.

In the system according to the second aspect, the skipping means may cause the variable length decoding device to skip the decoding operation until the variable length decoding device detects a predetermined code.

In the system according to the second aspect, the predetermined code may be a code at a refresh position of an original signal.

In the system according to the second aspect, the code at the refresh position of the original signal may be a byte aligned code.

In the system according to the second aspect, the system may deal with an MPEG (Motion Picture Experts Group) signal, and the system may further comprise: elementary stream extracting means, disposed upstream of the buffer, for extracting an elementary stream defined in MPEG standard.

According to a third aspect of the present invention, there is provided a system for preventing an input of variable length codes from being interrupted, the system comprising: a variable length decoding device for decoding the variable length codes; a buffer for buffering the variable length codes to be supplied to the variable length decoding device; code position detecting means for detecting whether or not a variable length code presently decoded by the variable length decoding device is of a position apart from a refresh position of an original signal by a predetermined distance; first occupation rate detecting means for detecting whether or not an occupation rate of the variable length codes in the buffer has increased when the detected result by the code position detecting means represents that the variable length code presently decoded by the variable length decoding device is of the position apart from the refresh position of the original signal by the predetermined distance; and skipping means for causing the variable length decoding device to skip the decoding operation when the detected result by the code position detecting means represents that the variable length code presently decoded by the variable length decoding device is of the position apart from the refresh position by the predetermined distance and the detected result by the first occupation rate detecting means represents that the occupation rate of the variable length codes in the buffer has increased.

In the system according to the third aspect, the skipping means may cause the variable length decoding device to skip the decoding operation until the variable length decoding device detects a predetermined code.

In the system according to the third aspect, the predetermined code may be a code at a refresh position of an original signal.

In the system according to the third aspect, the code at the refresh position of the original signal may be a byte aligned code.

The system according to the third aspect may further comprise: second occupation rate detecting means for detecting whether or not the occupation rate of the variable length codes in the buffer has increased regardless of whether or not the detected result by the code position detecting means represents that the variable length code presently decoded by the variable length decoding device is of the position apart from the refresh position of the original signal by the predetermine distance; and discarding means for discarding the variable length codes to be supplied to the buffer when the detected result by the second occupation rate detecting means represents that the occupation rate of the variable length codes in the buffer has increased.

In the system according to the third aspect, the system may deal with an MPEG (Motion Picture Experts Group) signal, and the system may further comprise: elementary stream extracting means, disposed upstream of the discarding means, for extracting an elementary stream defined in MPEG standard.

In the system according to the third aspect, the system may deal with an MPEG (Motion Picture Experts Group) signal, and the system may further comprise: elementary stream extracting means, disposed upstream of the buffer, for extracting an elementary stream defined in MPEG standard.

These and other objects, features and advantages of the present invention will become more apparent in light of the following detailed description of the best mode embodiment thereof, as illustrated in the accompanying drawings.

BRIEF DESCRIPTION OF DRAWINGS

FIG. 2 is a table showing codes whose code length is less than four bits each corresponding to MPEG standard;

FIG. 3 is a table showing electronic watermarks whose total code length is less than eight bits each and that are inserted into two codes;

DESCRIPTION OF PREFERRED EMBODIMENTS

Figure 1:
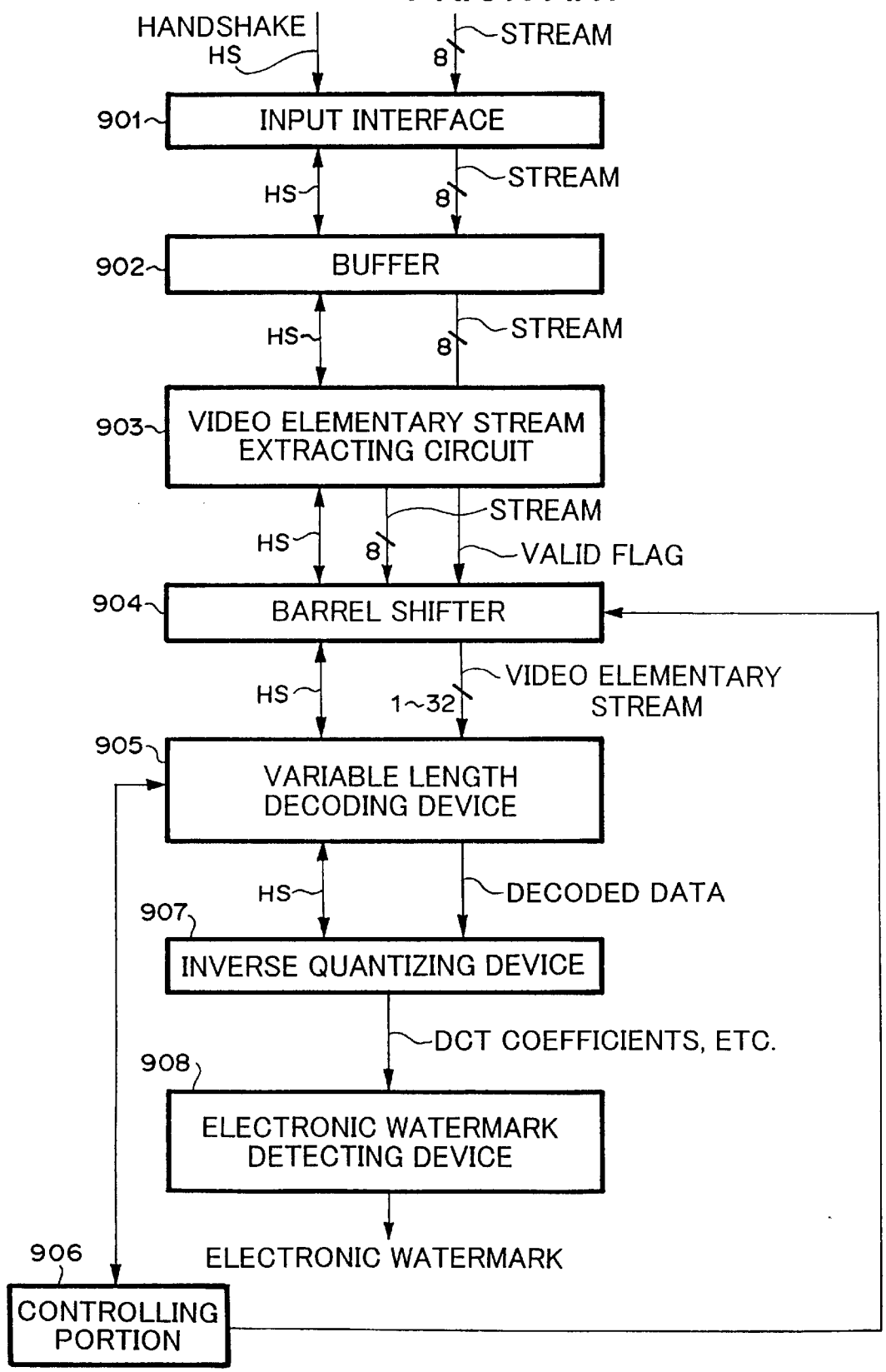
FIG. 1 is a block diagram showing the structure of a circuit that decodes an MPEG signal to DCT coefficients, and detects an electronic watermark from the obtained DCT coefficients according to related art.

Before describing embodiments of the present invention, a method for inserting an electronic watermark into an MPEG code without any change of the total code length in a limited range will be explained. In particular, a practical method for inserting an electronic watermark without any change of the total code length of two codes will be described.

Next, with reference to FIG. 2, the codes dealt in the present invention are only the codes, a length of each of which is less than four bits, as follows:

(1) "10" which is the of EOB (End Of Block) defined in a variable length code table for both non-intra-frame coefficients and intra frame coefficients in the case Intra_vlc_format=0 (namely, for both coefficients in the case Macroblock_intra=0 and coefficients in the case Macroblock_intra=1 and Intra_vlc_format=0), (2) "1s" (where s represents a sign) which is the code for a DC component having a level of 1 defined in the variable length code table for both non-intra-frame coefficients and intra frame coefficients in the case Intra_vlc_format=0 (namely, for both coefficients in the case Macroblock_intra=0 and coefficients in the case Macroblock_intra=1 and Intra_vlc_format=0), (3) "11s" (where s represents a sign) which is the code for (zero run length, level)=(0, 1) defined in the variable length code table for both non-intra-frame coefficients and intra frame coefficients in the case Intra_vlc_ format=0 (namely, for coefficients in the case Macroblock_intra=0 and coefficients in the case Macroblock_intra=1 and Intra_vlc_format=0), and (4) "10s" (where s represents a sign) which is the code for (zero run length, level)=(0, 1) defined in a variable length code table for intra-frame coefficients in the case Intra_vlc_format=1 (namely, for coefficients in the case Macroblock_intra=1 and Intra_vlc_format=1).

Since EOB cannot be changed, it cannot be converted into another code. "1s" corresponds to a DC component. When a DC component is changed, the picture deterioration is conspicuous. Thus, the case that "1s" is changed to another code is rare. Consequently, it can be considered that codes that are converted so that an electronic watermark is inserted thereto are only "11s" and "10s".

On the other hand, a controversial case for the present invention is the case that codes whose length is less than four bits each continue. Thus, it is sufficient to consider the case that the total code length of two codes is less than eight bits. This is because when the total code length of two codes is eight bits or more, the occupation rate of the variable length code in the buffer does not increase.

When we search the variable length code table for both non-intra-frame coefficients and intra-frame coefficients in the case Intra_vlc_format=0 for codes which result in a total code length less than eight bits when combined with the code "11s", only a code "011s" for (zero run length, level)= (1, 1) is found. Thus, only when "11s011s" is converted into "011s11s" or when "011s11s" is converted into "11s011s", an electronic watermark can be inserted.

When we search the variable length code table for an intra-frame coefficient in the case Intra_vlc_format=1 for codes which result in a total code length less than eight bits when combined with code "10s", only a code "010s" for (zero run length, level)=(0, 2) and a code "010s" for (zero run length, level)=(1, 1) are obtained. Thus, only when "10s110s" is converted into "110s10s", "110s10s" is converted into "10s110s", "10s010s" is converted into "010s10s", or "010s10s" is converted into "10s010s", an electronic watermark can be inserted.

The foregoing two matters are tabulated in FIG. 3. FIG. 3 shows that an electronic watermark that satisfies both a condition that it does not change the code length of two codes and a condition that code length of two codes is less than eight bits can be inserted into only six types of two-code sequences "011s11s", "11s011s", "110s10s", "10s110s", "010s10s", and "10s010s". On the other hand, there are many electronic watermarks that satisfy conditions that the code length of two codes is not changed and the code length of two codes is eight bits or more. Thus, most of electronic watermarks that do not change the code length of two codes are inserted into two-code sequences whose total code length is eight bits or more each. In other words, most of electronic watermarks that do not change the code length of two codes are not inserted into two-code sequences whose total code length is less than eight bits each.

An electronic watermark is statistically detected by checking DCT coefficients of many DCT blocks of one or more frames. Thus, even if DCT coefficients of a part of DCT blocks are lost, an electronic watermark can be detected. Consequently, after two-code sequences whose code length is less than eight bits each locally take place, even if the subsequence DCT coefficients cannot be reproduced, they do not largely affect the detection of an electronic watermark. In particular, after two-code sequences whose code length is less than eight bits each locally take place, there is a possibility that two-code sequences whose code length is less than eight bits each take place. Thus, after two-code sequences whose code length is less than eight bits each locally take place, even if the subsequent DCT coefficients cannot be reproduced, they do not largely affect the detection of the electronic watermark.

Next, with reference to the accompanying drawings, embodiments of the present invention will be described.

First Embodiment

Figure 4:
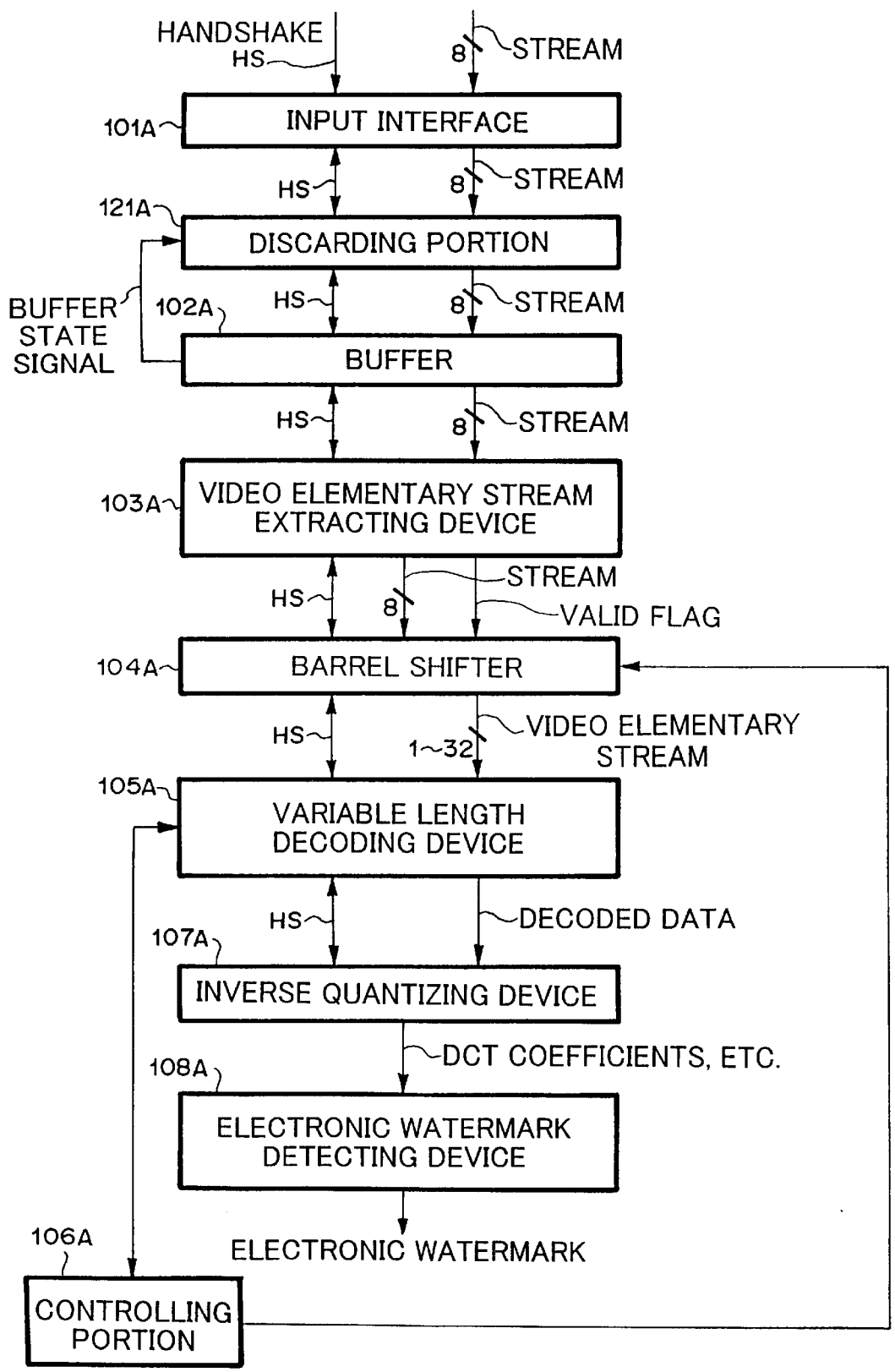
FIG. 4 is a block diagram showing the structure of a system that prevents an input of variable length codes from being interrupted according to a first embodiment of the present invention.

FIG. 4 is a block diagram showing the structure of a system that prevents an input of variable length codes from being interrupted according to a first embodiment of the present invention.

Referring to FIG. 4, a system that prevents an input of variable length codes from being interrupted corresponding to the first embodiment has an input interface 101A, a discarding portion 121A, a buffer 102A, a video elementary stream extracting device 103A, a barrel shifter 104A, a variable length decoding device 106A, a controlling portion 106A, an inverse quantizing device 107A, and an electronic watermark detecting device 108A.

Since the video elementary stream extracting device 103A, the barrel shifter 104A, the variable length decoding device 105A, the controlling portion 106A, the inverse quantizing device 107A, and the electronic watermark detecting device 108A shown in FIG. 4 are the same as the video elementary stream extracting circuit 903, the barrel shifter 904, the variable length decoding device 905, the controlling portion 906, the inverse quantizing device 907, and the electronic watermark detecting device 908 shown in FIG. 1, respectively, their description will be omitted.

The buffer 102A has at least the same function as the buffer 902. To maximally suppress the fabrication cost of the buffer 102A, the storage capacity of the buffer 102A is for example as low as several ten bytes to several thousand bytes. The buffer 102A detects whether or not the occupation rate of a variable length code in the buffer 102A exceeds a predetermined threshold value (for example, 87.5% (=1·⅛), 93.8% (=1·1/16), 96.9% (=1·1/32) or 100%) so as to detect whether or not the occupation rate of the variable length code in the buffer 102A has increased. When the occupation rate of the variable length codes in the buffer 102A has increased (namely, the occupation rate of the variable length codes in the buffer 102A exceeds a predetermined threshold value), the buffer 102A outputs to the discarding portion 121A a buffer state signal that represents that the buffer is full.

Figure 5:
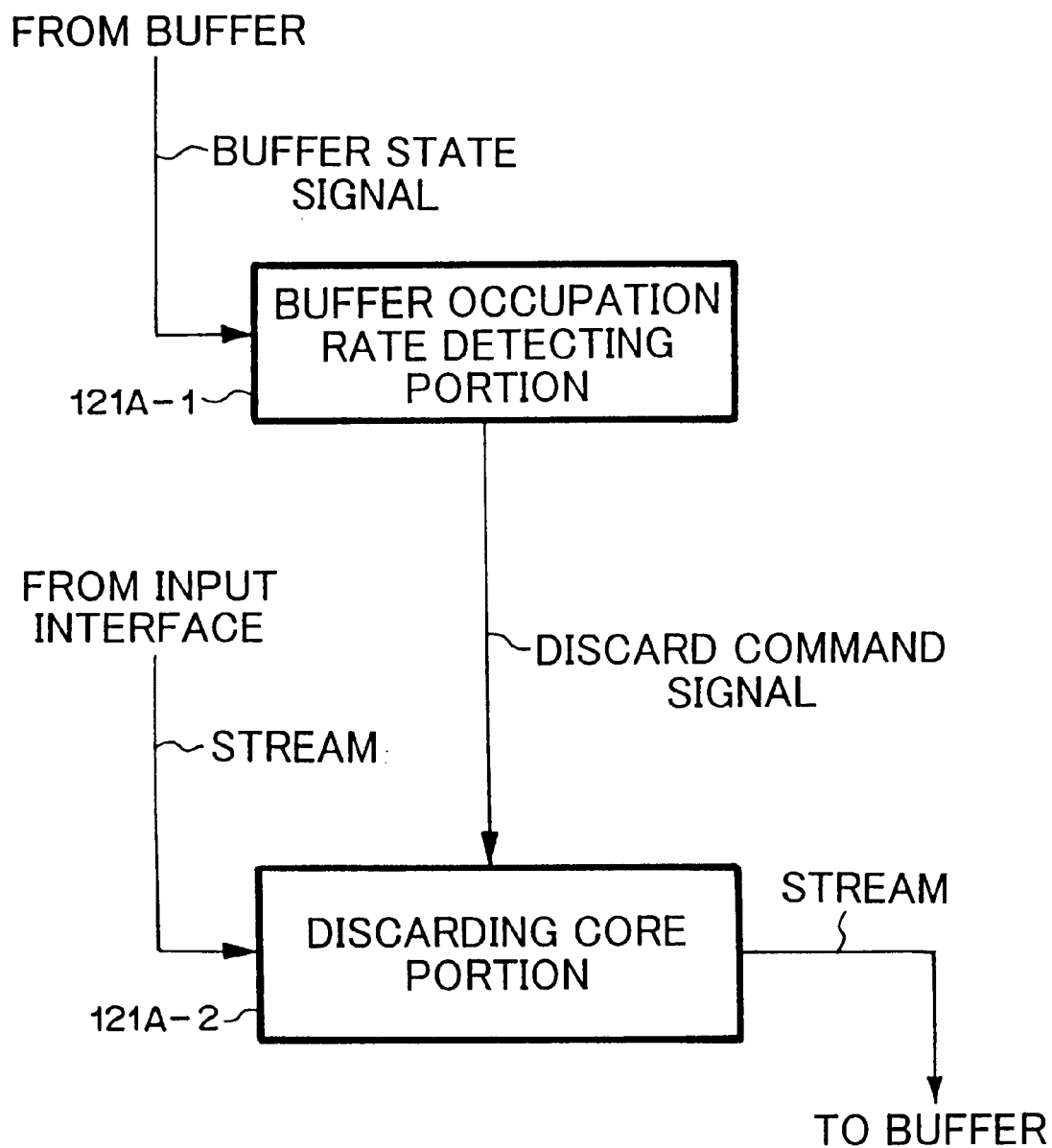
FIG. 5 is a block diagram showing the structure of a discarding portion according to the first embodiment of the present invention.

As shown in FIG. 5, the discarding portion 121A has a buffer occupation rate detecting portion 121A-1 and a discarding core portion 121A-2. When the buffer occupation rate detecting portion 121A-1 receives the buffer state signal that represents that the buffer is full from the buffer 102A, the discarding core portion 121A-2 discards a predetermined number of bytes (including variable length codes) of the stream. Alternatively, when the buffer state signal that is input from the buffer 102A represents that the buffer is full, the buffer occupation rate detecting portion 121A-1 and the discarding core portion 121A-2 of the discarding portion 121A start discarding each byte of the stream until the signal represents that the buffer is not full. Alternatively, provided that the buffer state signal represents that the buffer is normal when the occupation rate becomes lower than a threshold value (for example, 75% (=1·¼) against the above 87.5%, 87.5% against the above 93.8%, 87.5% against the above 96.9%, or 93.8% against the above 100%) that is lower than the threshold which indicates that the buffer is full, the discarding portion 121A may start discarding each byte of the stream until the buffer state signal represents the buffer normal state, and when the buffer state signal represents the buffer normal state, the discarding portion 121A stops discarding each byte of the stream.

Thus, according to the first embodiment, even if the storage capacity of the buffer 102A is small, the buffer 102A can be prevented from overflowing without interrupting an input of the stream from the pre-stage portion. The input permission signal that the input interface 101A outputs to the pre-stage portion always represents that the input is permitted.

In portions before and after the point where the stream is discarded, the variable length code discontinues. Therefore, the variable length decoding device 105A cannot perform decoding from the code which tails off at the discontinuous portion. However, like the controlling portion 906, under the control of the controlling portion 106A, the decoding operation can be resumed from a refresh position of a byte aligned code of a slice header code, a picture header code, or a sequence header code. Thus, the purpose which is to detect an electronic watermark is scarcely affected by the discarding, because no catastrophe is brought to the detection of the electronic watermark.

Second Embodiment

Figure 6:
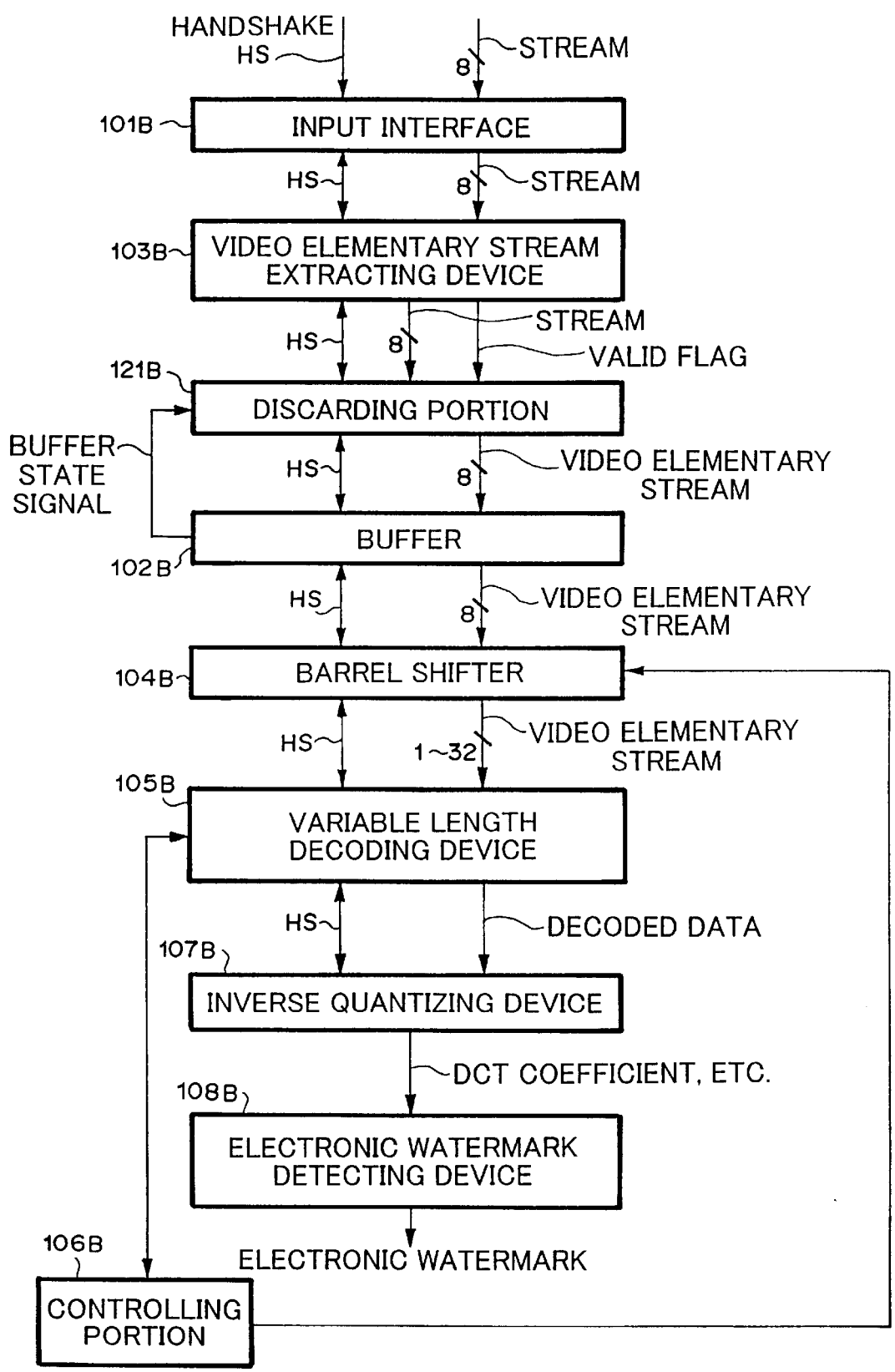
FIG. 6 is a block diagram showing the structure of a system that prevents an input of variable length codes from being interrupted according to a second embodiment of the present invention.

FIG. 6 is a block diagram showing the structure of a system that prevents an input of variable length codes from being interrupted according to a second embodiment of the present invention.

With reference to FIG. 6, the system according to the second embodiment has an input interface 101B, a video elementary stream extracting device 103B, a discarding portion 121B, a buffer 102B, a barrel shifter 104B, a variable length decoding device 105B, a controlling portion 106B, an inverse quantizing device 107B, and an electronic watermark detecting device 108B.

According to the second embodiment, the video elementary stream extracting device 103A that is disposed between the buffer 102A and the barrel shifter 104A is omitted from the system according to the first embodiment. The video elementary stream extracting device 103B that is the same as the video elementary stream extracting device 103A is disposed between the input interface 1011B and the discarding portion 121B.

Since the input interface 101B, the buffer 102B, the video elementary stream extracting device 103B, the barrel shifter 104B, the variable length decoding device 105B, the controlling portion 106B, the inverse quantizing device 107B, and the electronic watermark detecting device 108B are the same as the input interface 101A, the buffer 102A, the video elementary stream extracting device 103A, the barrel shifter 104A, the variable length decoding device 105A, the controlling portion 106A, the inverse quantizing device 107A, and the electronic watermark detecting device 108A, respectively, their description will be omitted.

The structure and function of the discarding portion 121B are the same as those of the discarding portion 121A according to the first embodiment except for the following points. Thus, the description of the similar portions will be omitted.

According to the first embodiment, the video elementary stream extracting device 103A outputs a valid flag to the barrel shifter 104A along with a stream. According to the first embodiment, the barrel shifter 104A inputs only a video elementary stream of the input stream corresponding to the valid flag. In contrast, according to the second embodiment, the video elementary stream extracting device 103B outputs a valid flag to the discarding portion 121B along with an input stream. The discarding portion 121B inputs only the video elementary stream of the input stream corresponding to the valid flag. Thus, according to the first embodiment, the outputs of the discarding portion 121A and the buffer 102A are streams, whereas according to the second embodiment, the outputs of the discarding portion 121B and the buffer 102B are video elementary streams. In addition, according to the first embodiment, the buffer 102A temporarily stores other portions that are not a video elementary stream of the input stream as well as the video elementary stream, whereas according to the second embodiment, the buffer 102B temporarily stores only a video elementary stream of the input stream. In other words, the buffer 102B does not store other portions that are not a video elementary stream of the input stream. Thus, the occupation rate of a variable length code in the buffer 102B does not tend to increase in comparison with the buffer 102A.

According to the first embodiment, since the discarding portion 121A is disposed upstream of the video elementary stream extracting device 103A, when the discarding portion 121A discards each byte of the stream, the input stream of the video elementary stream extracting device 103A becomes discontinuous. Thus, before extracting the video elementary stream, the video elementary stream extracting device 103A has to resume the operation from determining whether the input stream is a transport stream or a program stream at the discontinuous point. Thus, there is a possibility that the video elementary stream extracting device 103A discards more bytes than the discarding portion 121A does. In contrast, according to the second embodiment, since the discarding portion 121B is disposed downstream of the video elementary stream extracting device 103B, such a possibility can be avoided. Thus, according to the second embodiment, the influence to the detection of the electronic watermark is lower than that according to the first embodiment.

Third Embodiment

Figure 7:
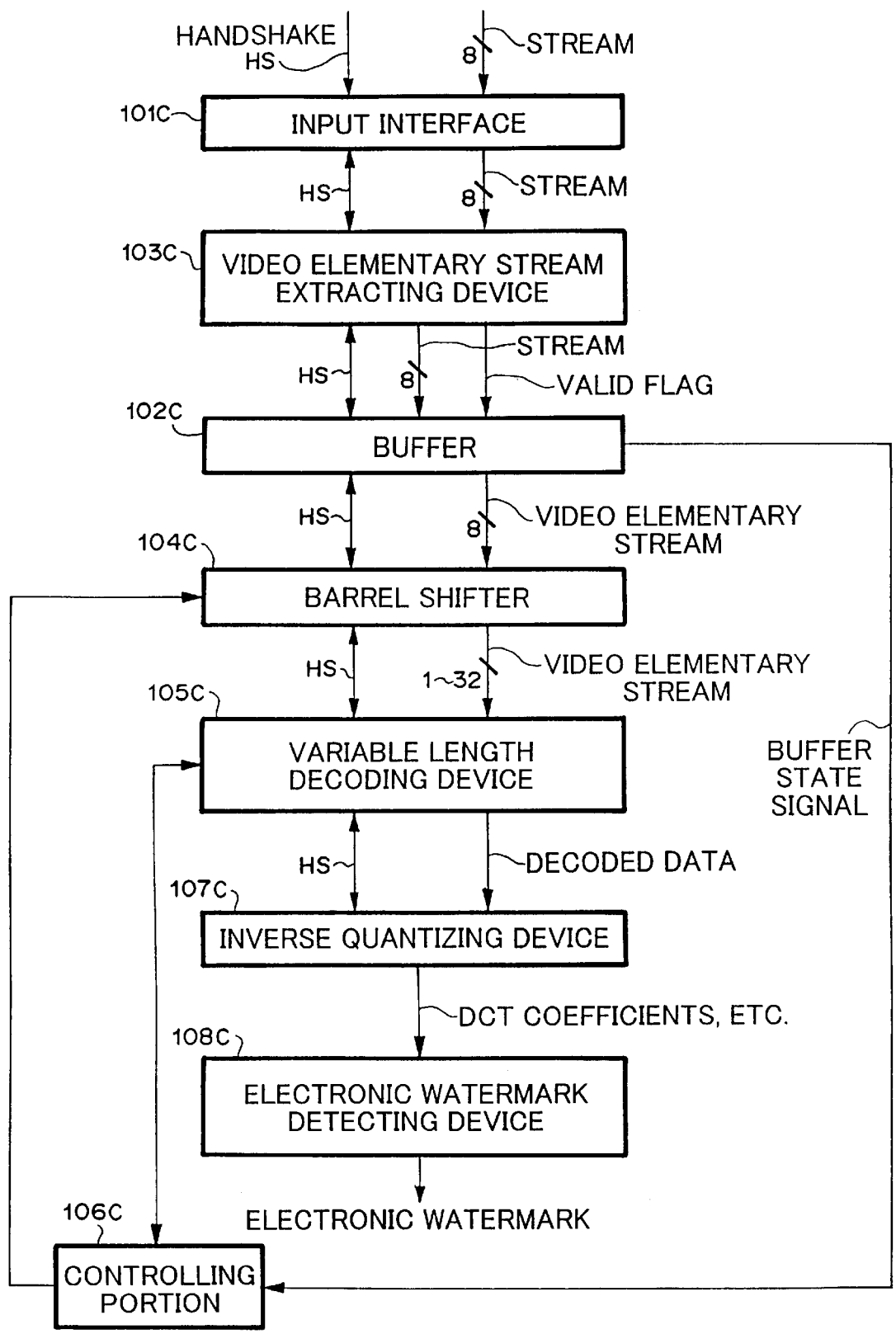
FIG. 7 is a block diagram showing the structure of a system that prevents an input of variable length codes from being interrupted according to a third embodiment of the present invention.

FIG. 7 is a block diagram showing the structure of a system that prevents an input of variable length codes from being interrupted according to a third embodiment of the present invention.

With reference to FIG. 7, the system according to the third embodiment has an input interface 10C, a video elementary stream extracting device 103C, a buffer 102C, a barrel shifter 104C, a variable length decoding device 105C, a controlling portion 106C, an inverse quantizing device 107C, and an electronic watermark detecting device 108C. The system according to the third embodiment does not have a discarding portion.

According to the third embodiment, the variable length decoding device 105C skips the decoding operation for a variable length code of a video elementary stream instead of that the discarding portion discards a part of the stream.

Since the input interface 101C, the video elementary stream extracting device 103C, the inverse quantizing device 107C, and the electronic watermark detecting device 108C according to the third embodiment are the same as the input interface 101B, the video elementary stream extracting device 103B, the inverse quantizing device 107B, and the electronic watermark detecting device 108B according to the second embodiment, respectively, their description will be omitted.

The buffer 102C, the barrel shifter 104C, the variable length decoding device 105C, and the controlling portion 106C have the following structures and functions in addition to the structures and functions of the buffer 102B, the barrel shifter 104B, the variable length decoding device 105B, and the controlling portion 106B.

Since the buffer 102C is disposed immediately downstream of the video elementary stream extracting device 103C, a stream and a valid flag are input from the video elementary stream extracting device 103C to the buffer 102C. Only bytes corresponding to valid flag representing active (namely, a video elementary stream) are input.

Figure 8:
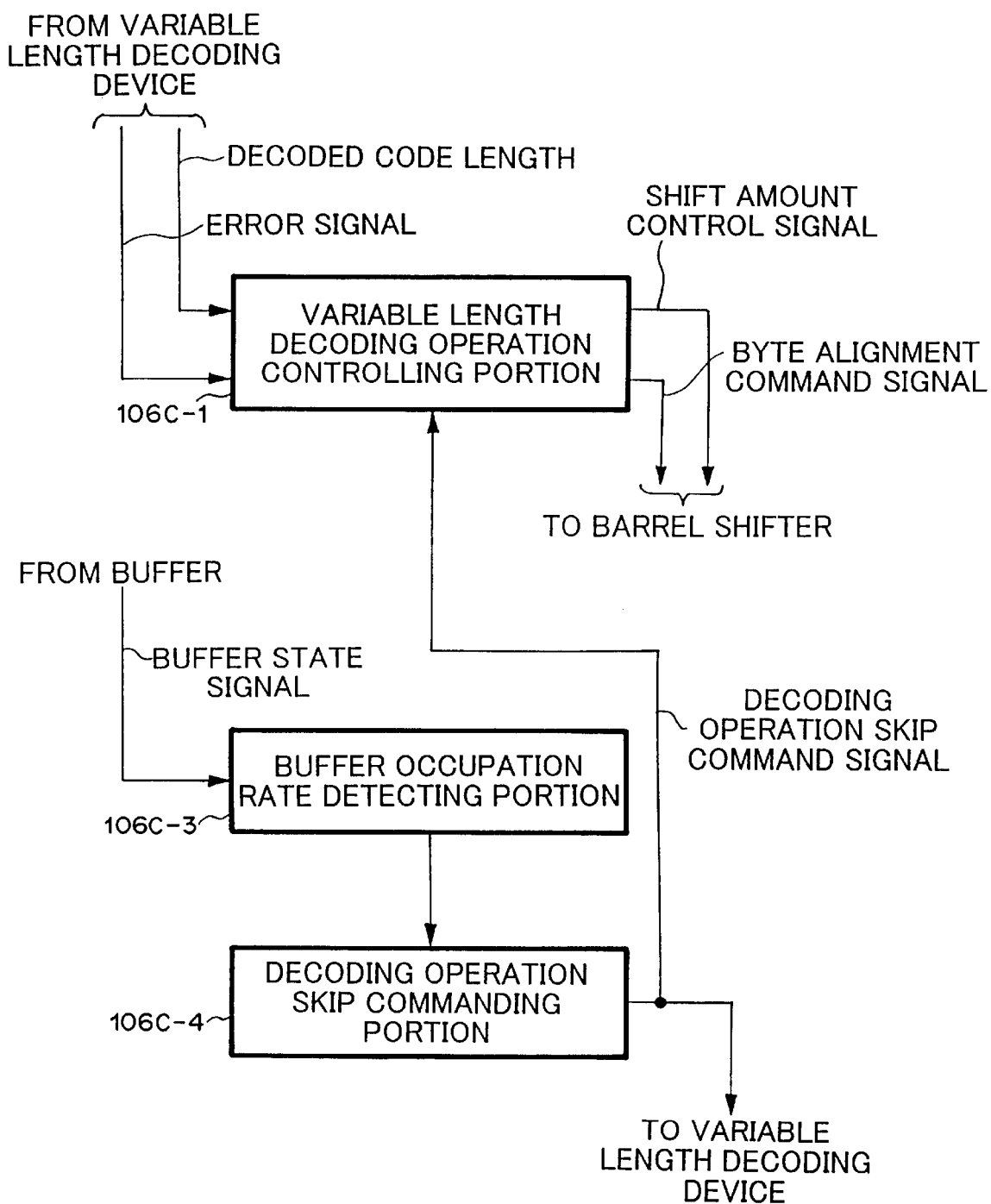
FIG. 8 is a block diagram showing the structure of a controlling portion according to the third embodiment of the present invention.

Referring to FIG. 8, the controlling portion 106C has a variable length decoding operation controlling portion 106C-1, a buffer occupation rate detecting portion 106C-3, and a decoding operation skip commanding portion 106C-4. The variable length decoding operation controlling portion 106C-1 inputs a decoded code length and an error signal from the variable length decoding device 105C. In addition, the variable length decoding operation controlling portion 106C-1 inputs a decoding operation skip command signal from the decoding operation skip commanding portion 106C-4. Corresponding to those signals, the variable length decoding operation controlling portion 106C-1 determines the values of a shift amount control signal and a byte alignment command signal corresponding to those signals and outputs the determined results to the barrel shifter 104C. The buffer occupation rate detecting portion 106C-3 inputs a buffer state signal from the buffer 102C. When the buffer occupation rate detecting portion 106C-3 has detected that the buffer state signal represents that the buffer is full, the decoding operation skip commanding portion 106C-4 causes, through the variable length decoding operation controlling portion 106C-1, the barrel shifter 104C to continue to perform a byte-aligned and eight-bit shift. In addition, the decoding operation skip commanding portion 106C-4 causes the variable length decoding device 105C to skip the decoding operation for the variable length code until a byte aligned variable length code is detected at a refresh position of a slice header code, a picture header code, a sequence header code, or the like. Thus, while the decoding operation is being skipped, the barrel shifter 104C continuously reads a byte sequence from the buffer 102C. As a result, the occupation rate of the variable length code in the buffer 102C can be actively decreased. When the variable length decoding device 105C detects a byte aligned variable length code, the barrel shifter 104C, the variable length decoding device 105C, and the controlling portion 106C resume their regular operations.

Fourth Embodiment

According to the second embodiment, a portion discarded in a video elementary stream does not deviate in probability in a slice defined in the MPEG standard. Thus, there is an equal probability that any portion of a slice is discarded. Thus, a nearly beginning portion of slice may be discarded. When some portion of some slice is discarded, the decoding operation may be resumed at the position of a picture header code or a sequence header code. However, in many cases, the decoding operation may be resumed at the position of a slice header code of the next slice. Thus, according to the second embodiment, there is a possibility that a nearly beginning portion of some slice is discarded and DCT blocks from the nearly beginning portion to the end of the slice are not decoded. In this case, the number of DCT blocks that are not decoded is large in comparison with the case that a nearly end portion of some slice is discarded and DCT blocks from the nearly end portion to the end portion are not decoded. Thus, according to the second embodiment, the influence to the detection of an electronic watermark is large.

In addition, according to the third embodiment, the position at which the decoding operation for a variable length code is skipped does not deviate in probability in a slice. In other words, the decoding operation for a variable length code may be skipped at any portion of a slice in equal probability. Thus, the decoding operation for a variable length code may be skipped at a nearly beginning portion of a slice. As was described above, when some portion of some slice is discarded, the decoding operation may be resumed at the position of a picture header code or a sequence header code. However, in many cases, the decoding operation may be resumed at the position of a slice header code of the next slice. Thus, according to the third embodiment, the decoding operation for a variable length code may be skipped from a nearly beginning portion of some slice. As a result, there is a possibility that DCT blocks are not decoded from the nearly beginning position to the end of the slice. In this case, since the number of DCT blocks that are not decoded is large, the influence to the detection of an electronic watermark is large in comparison with the case that the decoding operation for a variable length code is skipped from a nearly end portion of some slice to the end position thereof and DCT blocks are not decoded from the nearly end portion to the end portion of the slice.

In addition, according to the third embodiment, to securely prevent an input of a stream from the decoding portion to the input interface from being interrupted, it is necessary to set a lower occupation rate to the buffer state signal that represents that the buffer is full than the first embodiment and the second embodiment. Therefore, a part of the buffer 102C is not used and the buffer 102C cannot be effectively used.

The fourth embodiment solves the foregoing problem.

Figure 9:
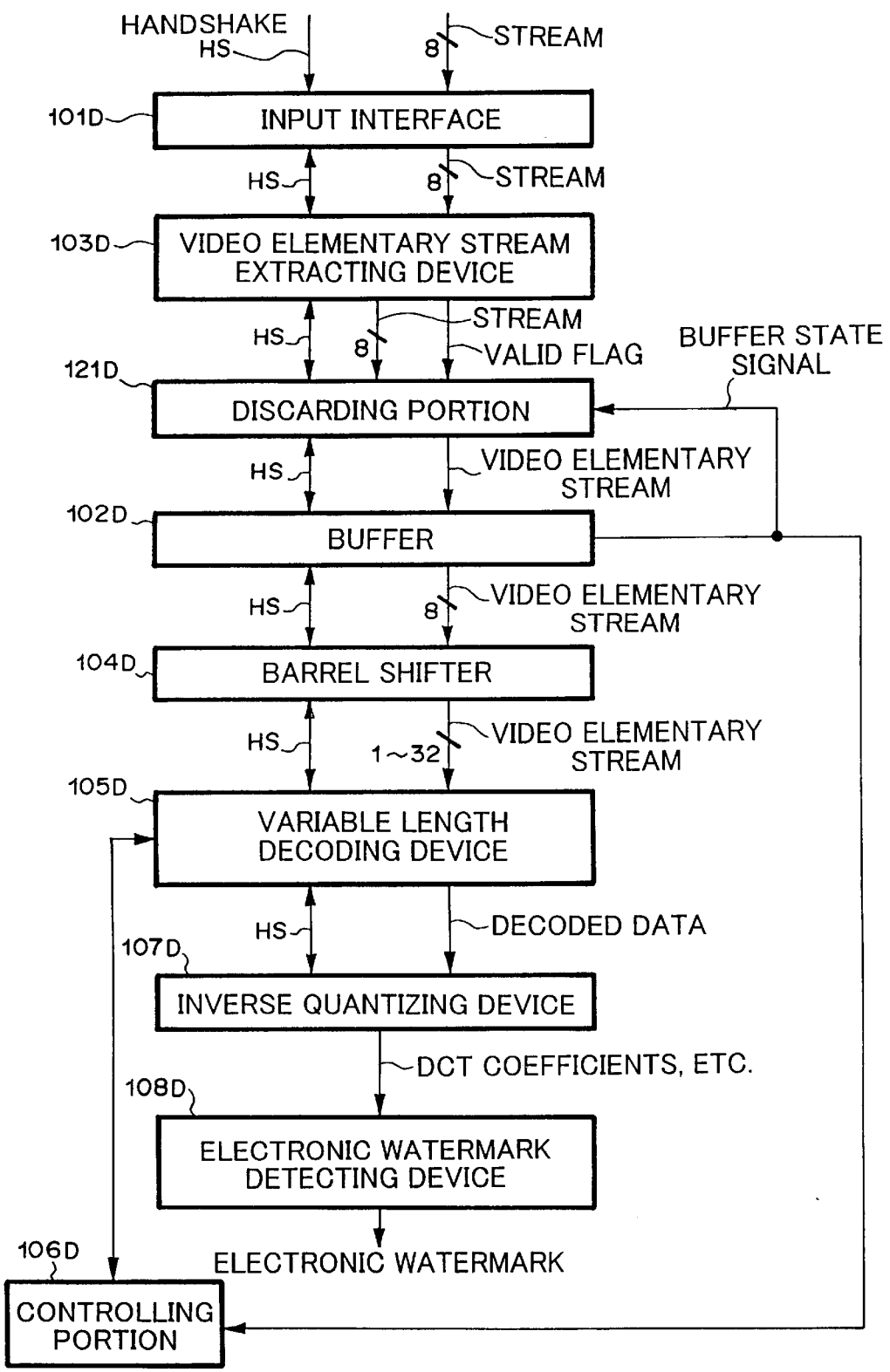
FIG. 9 is a block diagram showing the structure of a system that prevents an input of variable length codes from being interrupted according to a fourth embodiment of the present invention.

FIG. 9 is a block diagram showing the structure of a system that prevents an input of variable length codes from being interrupted according to the fourth embodiment of the present invention.

Referring to FIG. 9, the system according to the fourth embodiment has an input interface 101D, a video elementary stream extracting device 103D, a discarding portion 121D, a buffer 102D, a barrel shifter 104D, a variable length decoding device 105D, a controlling portion 106D, an inverse quantizing device 107D, and an electronic watermark detecting device 108D.

Since the input interface 101D, the video elementary stream extracting device 103D, the buffer 102D, the inverse quantizing device 107D, and the electronic watermark detecting device 108D are the same as the input interface 101B, the video elementary stream extracting device 103B, the buffer 102B, the inverse quantizing device 107B, and the electronic watermark detecting device 108B according to the second embodiment, respectively, their description will be omitted.

The barrel shifter 104D, the variable length decoding device 105D, and the controlling portion 106D have the following structures and functions in addition to the structures and functions of the barrel shifter 104B, the variable length decoding device 105B, and the controlling portion 106B according to the second embodiment.

Figure 10:
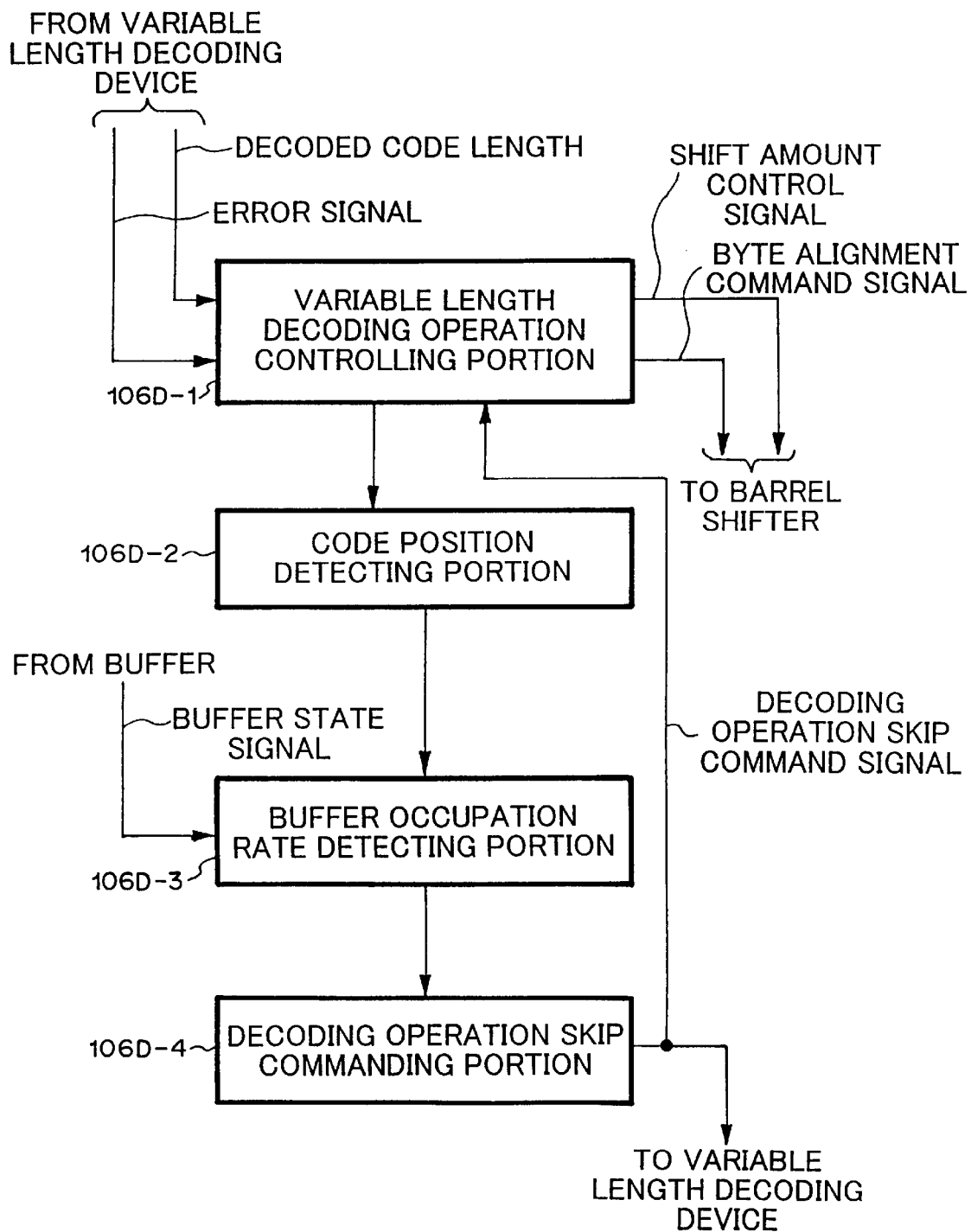
FIG. 10 is a block diagram showing the structure of a controlling portion according to the fourth embodiment of the present invention.

The controlling portion 106D inputs a buffer state signal from the buffer 102D. In addition, the controlling portion 106D inputs a decoded result from the variable length decoding device 105D. FIG. 10 shows the structure of the controlling portion 106D. The controlling portion 106D has a variable length decoding operation controlling portion 106D-1, a code position detecting portion 106D-2, a buffer occupation rate detecting portion 106D-3, and a decoding operation skip commanding portion 106D-4. The variable length decoding operation controlling portion 106D-1 inputs a decoded code length and an error signal from the variable length decoding device 105D. In addition, the variable length decoding operation controlling portion 106D-1 inputs a decoding operation skip command signal from the decoding operation skip commanding portion 106D-4. Corresponding to these signals, the variable length decoding operation controlling portion 106D-1 determines the values of a shift amount control signal and a byte alignment command signal and outputs the determined results to the barrel shifter 104D. The code position detecting portion 106D-2 calculates the position of the currently decoded macro block in the slice as a macro block number. When the code position detecting portion 106D-2 has determined that the calculated macro block number is a predetermined position in a nearly end portion of the slice (for example, the position of 75%, 87.5%, 93.8% or 96.9% from the beginning of the slice or the position traced back from the end of the slice by a predetermined number of macro blocks), the buffer occupation rate detecting portion 106D-3 starts to determine whether or not the buffer state signal represents that the buffer is full. When the determined result is positive, the decoding operation skip commanding portion 106D-4 causes, through the variable length decoding operation controlling portion 106D-1, the barrel shifter 104D to continue to perform a byte-aligned and eight-bit shift. In addition, the decoding operation skip commanding portion 106D-4 causes the variable length decoding device 105D to skip the decoding operation until a byte aligned variable length code is detected at a refresh position of a slice header code, a picture header code, a sequence header code, or the like. Thus, while the decoding operation is being skipped, the barrel shifter 104D continuously reads a byte sequence from the buffer 102D. As a result, the occupation rate of a variable length code in the buffer 102D can be actively decreased. When the variable length decoding device 105D has detected a byte aligned variable length code, the barrel shifter 104D, the variable length decoding device 105D, and the controlling portion 106D resume their regular operations.

According to the fourth embodiment, since the decoding operation is skipped from a predetermined position of a nearly end portion of a slice to the end position thereof, the number of DCT blocks that are not decoded can be decreased to a predetermined number. Thus, the influence to the detection of an electronic watermark is lower than the second embodiment and the third embodiment.

In addition, according to the fourth embodiment, since the position at which the skipping of the decoding operation for a variable length code is started is limited, the input of a stream from the pre-stage portion to the input interface that does a handshake with it has to be interrupted when the occupation rate of the variable length code in the buffer 102D is increased at any position other than the limited position in the worst case. To prevent such a problem, the system according to the fourth embodiment has the same structure as the system according to the second embodiment. In other words, the system according to the fourth embodiment has the discarding portion 121D that is the same as the discarding portion 121B of the system according to the second embodiment. Unlike the controlling portion 106D, the discarding portion 121D always monitors a buffer state signal. When the buffer state signal represents the buffer is full, the discarding portion 121B discards each byte (including a variable length code) of a video elementary stream in the same manner as the first embodiment and the second embodiment.

In FIG. 9, the buffer state signal supplied from the buffer 102D to the controlling portion 106D is the same as the buffer state signal supplied from the buffer 102D to the discarding portion 121D. Alternatively, they may be independent signals. Different threshold values that represent the buffer is full may be assigned to those signals. In particular, it is preferred to assign a lower threshold value to the buffer state signal supplied from the buffer 102D to the controlling portion 106D than the buffer state signal supplied from the buffer 102D to the discarding portion 121D in order to reduce the occupation rate of variable length codes in the buffer 102D by the operation of barrel shifter 104D, the variable length decoding device 105D and the controlling portion 106D as a rule, and to have the discarding portion 121D operate only in an emergency situation.

According to each of the first to fourth embodiments, a system that prevents an input of variable length codes from being interrupted is accomplished by hardware. Alternatively, a method for preventing an input of variable length codes from being interrupted can be accomplished by a computer that reads a program that causes the computer to execute the method from a record medium on which the program has been recorded and executes the program. Alternatively, a method for preventing an input of variable length codes from being interrupted may be accomplished by a computer that receives a program that causes the computer to execute the method through a network, reads the program, and executes the program.

As was described above, the present invention takes the following effects.

As a first effect, since an input stream is not interrupted, a pre-stage portion that supplies the input stream to a system according to the present invention does not need to provide a complicated circuit and a mechanism that prevents the input stream from being interrupted. Thus, the fabrication cost of the pre-stage portion can be lowered.

As a second effect, since the storage capacity of the buffer can be decreased, the fabrication cost is not raised.

As a third effect, it is not necessary to remarkably increase the operation speed of the variable length decoding device, and therefore, it is not difficult to design the timings of individual portions of the system.

The present invention takes first to third effects by the following reasons. When the occupation rate of a variable length code in the buffer increases, the discarding circuit discards a stream (including the variable length code) that is supplied to the buffer. Thus, the occupation rate of the variable length code in the buffer can be decreased. In addition, when the occupation rate of a variable length code in the buffer is increased, the variable length decoding device skips the decoding operation. Thus, the variable length code in the buffer can be read actively at high speed. As a result, the occupation rate of the variable length code in the buffer can be decreased.

As a fourth effect, when the video elementary stream extracting device is disposed upstream of the discarding circuit, the influence to the detection of an electronic watermark is lower than that when the video elementary stream extracting device is disposed downstream of the discarding circuit. This is because, when the discarding circuit discards a stream, the video elementary stream extracting device does not need to determine whether the input stream is a transport stream or a program stream. In addition, a portion that is larger than a portion discarded by the discarding circuit is not discarded from the video elementary stream.

As a fifth effect, when the variable length decoding device skips the decoding operation in the case that detected results represent that a variable length code decoded by the variable length decoding device is apart from a refresh position of the original signal by a predetermined distance and that the occupation rate of the variable length code in the buffer has increased, the influence to the detection of a electronic watermark is lower than that in the case that the detected result represents that the occupation rate of the variable length code in the buffer has been increased regardless of whether or not the variable length code decoded by the variable length decoding device is apart from the refresh position of the original signal by the predetermined length.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A system for preventing an input of variable length codes from being interrupted, the system comprising:
    a variable length decoding device for decoding the variable length codes;
    a buffer for buffering the variable length codes to be supplied to the variable length decoding device;
    detecting means for detecting whether or not an occupation rate of the variable length codes in the buffer has increased; and
    discarding means for discarding the variable length codes to be supplied to the buffer when the occupation rate of the variable length codes in the buffer has increased.

2. The system as set forth in claim 1,
    wherein the system deals with an MPEG (Motion Picture Experts Group) signal, and
    wherein the system further comprises:
        elementary stream extracting means, disposed between the buffer and the variable length decoding device, for extracting an elementary stream defined in MPEG standard.

3. The system as set forth in claim 1,
wherein the system deals with an MPEG (Motion Picture Experts Group) signal, and
wherein the system further comprises:
elementary stream extracting means, disposed upstream of the discarding means, for extracting an elementary stream defined in MPEG standard.

4. A system for preventing an input of variable length codes from being interrupted, the system comprising:
a variable length decoding device for decoding the variable length codes;
a buffer for buffering the variable length codes to be supplied to the variable length decoding device;
detecting means for detecting whether or not an occupation rate of the variable length codes in the buffer has increased; and
skipping means for causing the variable length decoding device to skip the decoding operation when the occupation rate of the variable length codes in the buffer has increased.

5. The system as set forth in claim 4,
wherein the skipping means causes the variable length decoding device to skip the decoding operation until the variable length decoding device detects a predetermined code.

6. The system as set forth in claim 5,
wherein the predetermined code is a code at a refresh position of an original signal.

7. The system as set forth in claim 6,
wherein the code at the refresh position of the original signal is a byte aligned code.

8. The system as set forth in claim 4,
wherein the system deals with an MPEG (Motion Picture Experts Group) signal, and
wherein the system further comprises:
elementary stream extracting means, disposed upstream of the buffer, for extracting an elementary stream defined in MPEG standard.

9. A system for preventing an input of variable length codes from being interrupted, the system comprising:
a variable length decoding device for decoding the variable length codes;
a buffer for buffering the variable length codes to be supplied to the variable length decoding device;
code position detecting means for detecting whether or not a variable length code presently decoded by the variable length decoding device is of a position apart from a refresh position of an original signal by a predetermined distance;
first occupation rate detecting means for detecting whether or not an occupation rate of the variable length codes in the buffer has increased when the detected result by the code position detecting means represents that the variable length code presently decoded by the variable length decoding device is of the position apart from the refresh position of the original signal by the predetermined distance; and
skipping means for causing the variable length decoding device to skip the decoding operation when the detected result by the code position detecting means represents that the variable length code presently decoded by the variable length decoding device is of the position apart from the refresh position by the predetermined distance and the detected result by the first occupation rate detecting means represents that the occupation rate of the variable length codes in the buffer has increased.

10. The system as set forth in claim 9,
wherein the skipping means causes the variable length decoding device to skip the decoding operation until the variable length decoding device detects a predetermined code.

11. The system as set forth in claim 10,
wherein the predetermined code is a code at a refresh position of an original signal.

12. The system as set forth in claim 11,
wherein the code at the refresh position of the original signal is a byte aligned code.

13. The system as set forth in claim 9, further comprising:
second occupation rate detecting means for detecting whether or not the occupation rate of the variable length codes in the buffer has increased regardless of whether or not the detected result by the code position detecting means represents that the variable length code presently decoded by the variable length decoding device is of the position apart from the refresh position of the original signal by the predetermine distance; and
discarding means for discarding the variable length codes to be supplied to the buffer when the detected result by the second occupation rate detecting means represents that the occupation rate of the variable length codes in the buffer has increased.

14. The system as set forth in claim 13,
wherein the system deals with an MPEG (Motion Picture Experts Group) signal, and
wherein the system further comprises:
elementary stream extracting means, disposed upstream of the discarding means, for extracting an elementary stream defined in MPEG standard.

15. The system as set forth in claim 9,
wherein the system deals with an MPEG (Motion Picture Experts Group) signal, and
wherein the system further comprises:
elementary stream extracting means, disposed upstream of the buffer, for extracting an elementary stream defined in MPEG standard.

16. A method for preventing an input of variable length codes from being interrupted, the method comprising the steps of:
causing a buffer to buffer the variable length codes;
causing a variable length decoding device to decode the buffered variable length codes;
detecting whether or not an occupation rate of the variable length codes in the buffer has increased; and
causing discarding means to discard the variable length codes to be supplied to the buffer when the occupation rate of the variable length codes in the buffer has increased.

17. The method as set forth in claim 16,
wherein the method deals with an MPEG (Motion Picture Experts Group) signal, and
wherein the method further comprises the step of:
causing elementary stream extracting means, disposed between the buffer and the variable length decoding device, to extract an elementary stream defined in MPEG standard.

18. The method as set forth in claim 16,
wherein the method deals with an MPEG (Motion Picture Experts Group) signal, and wherein the method further comprises the step of:
  causing elementary stream extracting means, disposed upstream of the discarding means, to extract an elementary stream defined in MPEG standard.

19. A method for preventing an input of variable length codes from being interrupted, the method comprising the steps of:
  causing a buffer to buffer the variable length codes;
  causing a variable length decoding device to decode the buffered variable length code;
  detecting whether or not an occupation rate of the variable length codes in the buffer has increased; and
  causing the variable length decoding device to skip the decoding operation when the occupation rate of the variable length codes in the buffer has increased.

20. The method as set forth in claim 19,
  wherein the skipping step causes the variable length decoding device to skip the decoding operation until the variable length decoding device detects a predetermined code.

21. The method as set forth in claim 20,
  wherein the predetermined code is a code at a refresh position of an original signal.

22. The method as set forth in claim 21,
  wherein the code at the refresh position of the original signal is a byte aligned code.

23. The method as set forth in claim 19,
  wherein the method deals with an MPEG (Motion Picture Experts Group) signal, and
  wherein the method further comprises the step of:
    causing elementary stream extracting means, disposed upstream of the buffer, to extract an elementary stream defined in MPEG standard.

24. A method for preventing an input of variable length codes from being interrupted, the method comprising the steps of:
  causing a buffer to buffer the variable length codes;
  causing a variable length decoding device to decode the buffered variable length codes;
  detecting whether or not a variable length code presently decoded by the variable length decoding device is of a position apart from a refresh position of an original signal by a predetermined distance;
  detecting whether or not an occupation rate of the variable length codes in the buffer has increased when the detected result by the detecting step represents that the variable length code presently decoded by the variable length decoding device is of the position apart from the refresh position of the original signal by the predetermined distance; and
  causing the variable length decoding device to skip the decoding operation when the detected result by the code position detecting step represents that the variable length code presently decoded by the variable length decoding device is of the position apart from the refresh position by the predetermined distance and the detected result by the first occupation rate detecting step represents that the occupation rate of the variable length codes in the buffer has increased.

25. The method as set forth in claim 24,
  wherein the skipping step causes the variable length decoding device to skip the decoding operation until the variable length decoding device detects a predetermined code.

26. The method as set forth in claim 25,
  wherein the predetermined code is a code at a refresh position of an original signal.

27. The method as set forth in claim 26,
  wherein the code at the refresh position of the original signal is a byte aligned code.

28. The method as set forth in claim 24, further comprising the steps of:
  detecting whether or not the occupation rate of the variable length codes in the buffer has increased regardless of whether or not the detected result by the code position detecting step represents that the variable length code presently decoded by the variable length decoding device is of the position apart from the refresh position of the original signal by the predetermine distance; and
  discarding the variable length codes to be supplied to the buffer when the detected result by the second occupation rate detecting step represents that the occupation rate of the variable length codes in the buffer has increased.

29. The method as set forth in claim 28,
  wherein the method deals with an MPEG (Motion Picture Experts Group) signal, and
  wherein the method further comprises the step of:
    causing elementary stream extracting means, disposed upstream of the discarding means, to extract an elementary stream defined in MPEG standard.

30. The method as set forth in claim 24,
  wherein the method deals with an MPEG (Motion Picture Experts Group) signal, and
  wherein the method further comprises the step of:
    causing elementary stream extracting means, disposed upstream of the buffer, to extract an elementary stream defined in MPEG standard.

31. A record medium on which a program that causes a computer to execute a method for preventing an input of variable length codes from being interrupted, the method comprising the steps of:
  causing a buffer to buffer the variable length codes;
  causing a variable length decoding device to decode the buffered variable length codes;
  detecting whether or not an occupation rate of the variable length codes in the buffer has increased; and
  causing discarding means to discard the variable length codes to be supplied to the buffer when the occupation rate of the variable length codes in the buffer has increased.

32. The record medium as set forth in claim 31,
  wherein the method deals with an MPEG (Motion Picture Experts Group) signal, and
  wherein the method further comprises the step of:
    causing elementary stream extracting means, disposed between the buffer and the variable length decoding device, to extract an elementary stream defined in MPEG standard.

33. The record medium as set forth in claim 31,
  wherein the method deals with an MPEG (Motion Picture Experts Group) signal, and
  wherein the method further comprises the step of:
    causing elementary stream extracting means, disposed upstream of the discarding means, to extract an elementary stream defined in MPEG standard.

34. A record medium on which a program that causes a computer to execute a method for preventing an input of variable length codes from being interrupted, the method comprising the steps of:

causing a buffer to buffer the variable length codes;

causing a variable length decoding device to decode the buffered variable length code;

detecting whether or not an occupation rate of the variable length codes in the buffer has increased; and causing the variable length decoding device to skip the decoding operation when the occupation rate of the variable length codes in the buffer has increased.

35. The record medium as set forth in claim 34, wherein the skipping step causes the variable length decoding device to skip the decoding operation until the variable length decoding device detects a predetermined code.

36. The record medium as set forth in claim 35, wherein the predetermined code is a code at a refresh position of an original signal.

37. The record medium as set forth in claim 36, wherein the code at the refresh position of the original signal is a byte aligned code.

38. The record medium as set forth in claim 34, wherein the method deals with an MPEG (Motion Picture Experts Group) signal, and wherein the method further comprises the step of:
causing elementary stream extracting means, disposed upstream of the buffer, to extract an elementary stream defined in MPEG standard.

39. A record medium on which a program that causes a computer to execute a method for preventing an input of variable length codes from being interrupted, the method comprising the steps of:

causing a buffer to buffer the variable length codes;

causing a variable length decoding device to decode the buffered variable length codes;

detecting whether or not a variable length code presently decoded by the variable length decoding device is of a position apart from a refresh position of an original signal by a predetermined distance;

detecting whether or not an occupation rate of the variable length codes in the buffer has increased when the detected result by the detecting step represents that the variable length code presently decoded by the variable length decoding device is of the position apart from the refresh position of the original signal by the predetermined distance; and causing the variable length decoding device to skip the decoding operation when the detected result by the code position detecting step represents that the variable length code presently decoded by the variable length decoding device is of the position apart from the refresh position by the predetermined distance and the detected result by the first occupation rate detecting step represents that the occupation rate of the variable length codes in the buffer has increased.

40. The record medium as set forth in claim 39, wherein the skipping step causes the variable length decoding device to skip the decoding operation until the variable length decoding device detects a predetermined code.

41. The record medium as set forth in claim 40, wherein the predetermined code is a code at a refresh position of an original signal.

42. The record medium as set forth in claim 41, wherein the code at the refresh position of the original signal is a byte aligned code.

43. The record medium as set forth in claim 39, further comprising the steps of:

detecting whether or not the occupation rate of the variable length codes in the buffer has increased regardless of whether or not the detected result by the code position detecting step represents that the variable length code presently decoded by the variable length decoding device is of the position apart from the refresh position of the original signal by the predetermine distance; and discarding the variable length codes to be supplied to the buffer when the detected result by the second occupation rate detecting step represents that the occupation rate of the variable length codes in the buffer has increased.

44. The record medium as set forth in claim 43, wherein the method deals with an MPEG (Motion Picture Experts Group) signal, and wherein the method further comprises the step of:
causing elementary stream extracting means, disposed upstream of the discarding means, to extract an elementary stream defined in MPEG standard.

45. The record medium as set forth in claim 39, wherein the method deals with an MPEG (Motion Picture Experts Group) signal, and wherein the method further comprises the step of:
causing elementary stream extracting means, disposed upstream of the buffer, to extract an elementary stream defined in MPEG standard.

* * * * *